US012676060B1

(12) United States Patent
Biemond et al.

(10) Patent No.: US 12,676,060 B1
(45) Date of Patent: Jul. 7, 2026

(54) SYSTEMS AND METHODS FOR A FALL PREVENTION SYSTEM

(71) Applicant: Dignity Health, San Francisco, CA (US)

(72) Inventors: Albert Biemond, San Francisco, CA (US); Trent Maruyama, San Francisco, CA (US)

(73) Assignee: Dignity Health, San Francisco, CA (US)

( * ) Notice: Subject to any disclaimer, the term of this patent is extended or adjusted under 35 U.S.C. 154(b) by 0 days.

(21) Appl. No.: 18/748,016

(22) Filed: Jun. 19, 2024

Related U.S. Application Data

(60) Provisional application No. 63/508,952, filed on Jun. 19, 2023.

(51) Int. Cl.
| | |
|---|---|
| *G08B 21/02* | (2006.01) |
| *B25J 11/00* | (2006.01) |
| *G03H 1/00* | (2006.01) |
| *G06T 7/70* | (2017.01) |
| *G06V 10/774* | (2022.01) |
| *G06V 20/52* | (2022.01) |
| *G06V 40/10* | (2022.01) |
| *G06V 40/20* | (2022.01) |
| *G08B 7/06* | (2006.01) |

(52) U.S. Cl.
CPC ............. *G08B 21/02* (2013.01); *B25J 11/009* (2013.01); *G03H 1/0005* (2013.01); *G06T 7/70* (2017.01); *G06V 10/774* (2022.01); *G06V 20/52* (2022.01); *G06V 40/10*

(2022.01); *G06V 40/23* (2022.01); *G08B 7/06* (2013.01); *G06T 2207/20081* (2013.01); *G06T 2207/30196* (2013.01); *G06T 2207/30232* (2013.01)

(58) Field of Classification Search
CPC .......... G08B 21/02; G08B 7/06; B25J 11/009; G03H 1/0005; G06T 7/70; G06T 2207/20081; G06T 2207/30196; G06T 2207/30232; G06V 10/774; G06V 20/52; G06V 40/10; G06V 40/23
See application file for complete search history.

(56) References Cited

U.S. PATENT DOCUMENTS

| | | | | |
|---|---|---|---|---|
| 2008/0001735 A1* | 1/2008 | Tran | ..................... | A61B 5/0022 |
| | | | | 340/539.22 |
| 2015/0077534 A1* | 3/2015 | Derenne | ............... | G06F 3/0416 |
| | | | | 348/77 |
| 2015/0206409 A1* | 7/2015 | Visvanathan | ............ | A61B 5/11 |
| | | | | 340/573.1 |
| 2019/0012893 A1* | 1/2019 | Johnson | ............... | G08B 21/043 |
| 2019/0205630 A1* | 7/2019 | Kusens | ............... | A61B 5/6891 |
| 2020/0302187 A1* | 9/2020 | Wang | ..................... | G06V 20/52 |
| 2022/0071512 A1* | 3/2022 | McAnena | ............ | A61B 5/6844 |
| 2022/0167880 A1* | 6/2022 | Addison | ............... | A61B 5/1114 |

* cited by examiner

*Primary Examiner* — Rufus C Point
(74) *Attorney, Agent, or Firm* — Polsinelli PC

(57) ABSTRACT

A fall prevention system provides intervention and distraction to attempt to prevent a "fall risk" patient from falling from bed while providing alerts to caregivers. The system provides verbal, visual and tactile interventions to create a distraction and time for a nurse or caregiver to intervene and prevent a fall.

22 Claims, 9 Drawing Sheets

Tell us what you need!

!! EMERGENCY HELP !!

Restroom

Water/Food/Amenities

Cleanup

Adjust something

Medication / Pain management

I want to stretch my legs

Other |

Cancel

Because you are at risk of falling, let us help you.

Is there something we can do for you?

Select from Menu

Chat with staff

EMERGENCY

SYSTEMS AND METHODS FOR A FALL PREVENTION SYSTEM

CROSS-REFERENCE TO RELATED APPLICATIONS

This is a U.S. Non-Provisional Patent Application that claims benefit to U.S. Provisional Patent Application Ser. No. 63/508,952 filed 19 Jun. 2023, which is herein incorporated by reference in its entirety.

FIELD

The present disclosure generally relates to monitoring and alert systems in a healthcare setting, and in particular, to a system and associated method for a fall prevention system.

BACKGROUND

In healthcare facilities, fall risk is a common concern for elderly patients, those with temporary or permanent conditions affecting mobility, and/or those in an otherwise weakened state. Oftentimes patients will try to get up out of their beds without assistance or supervision which can cause them to seriously injure themselves.

It is with these observations in mind, among others, that various aspects of the present disclosure were conceived and developed.

BRIEF DESCRIPTION OF THE DRAWINGS

Corresponding reference characters indicate corresponding elements among the view of the drawings. The headings used in the figures do not limit the scope of the claims.

DETAILED DESCRIPTION

A system and associated methods for fall prevention in a healthcare setting are disclosed herein. In particular, a system outlined herein detects attempts by "fall risk" patients to leave a bed or chair unaided and provides intervention in the form of commands and/or distraction to allow time for staff members to arrive. The system provides verbal, visual and tactile interventions to create a distraction and time for a staff member to intervene and prevent a fall. Further, upon detection, the system can generate alerts using communication systems (e.g., a phone app or a dedicated alert device) appropriate for a care facility.

System Overview

Figure 1:
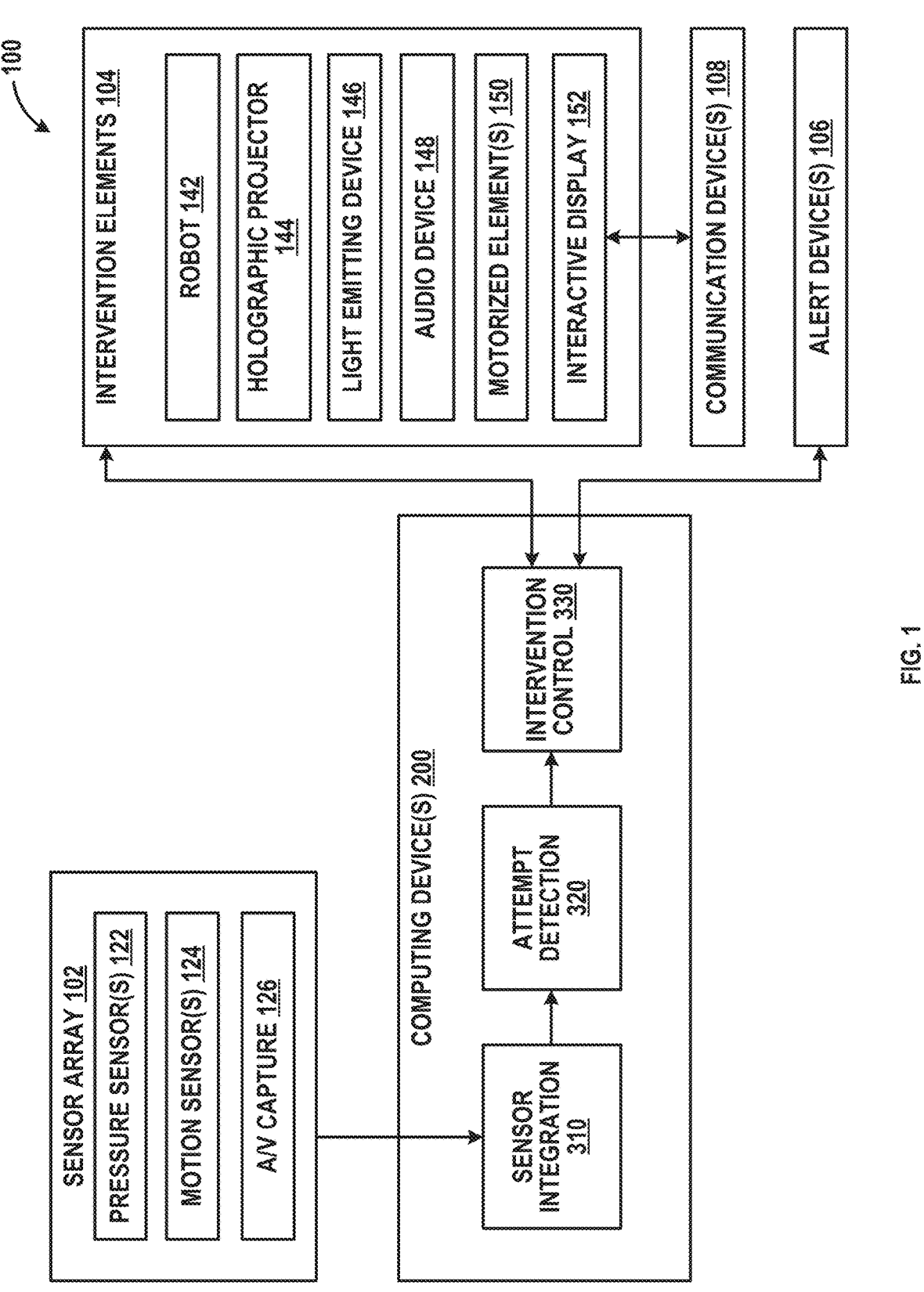
FIG. 1 is a simplified block diagram showing a fall prevention system outlined herein.

FIG. 1 shows a simplified diagram of a system 100 including a computing device 200 in communication with a sensor array 102, one or more intervention elements 104, one or more alert devices 106, and one or more communication devices 108. The system 100 can monitor a person to delay patients or persons from getting up, and gives time for nursing and or caregivers to attend to the patient and prevent the patient or person from standing and falling thus sustaining injury.

The system 100 monitors a patient through a sensor array 102 to detect attempts by the patient to get out of their bed or chair without help. Upon detection of an attempt, the system 100 activates the one or more intervention elements 104 to distract or delay the patient from attempting to get up, and issues an alert to one or more alert device(s) 106 associated with a practitioner, staff member or other supervising individual. The intervention elements 104 can include one or more of, for example, a robot 142, a holographic projector 144, light emitting devices 146, audio devices 148, motorized elements 150 and an interactive display 152.

The computing device 200 accesses data captured by the sensor array 102, and in some examples where the sensor array 102 includes multiple different types of sensors (e.g., pressure sensors, motion sensor(s), audio/video sensors), the computing device 200 may integrate the data captured by the sensor array 102 into multimodal sensor data, e.g., by a sensor integration module 310.

The system 100 can include an attempt detection module 320 that accesses the data captured by the sensor array 102 and applies one or more attempt detection methods to evaluate if the data captured by the sensor array 102 indicates that the patient is trying to get out of their bed or chair unaided. The attempt detection module 320 can include one or more machine learning and/or computer vision elements that detect potential attempts by the patient to get out of their bed or chair based on features present within the data captured by the sensor array 102.

The attempt detection module 320 is operable to determine when a patient is moving into a position towards the edge of the bed (or chair) and preparing to stand. This can be accomplished using the sensor array 102 including pressure-sensitive pads to determine that the weight of the patient is changing from, for example, a supine position (laying on back, side or stomach) to a sitting at the edge of the bed or chair position in preparation for standing.

The attempt detection module 320 may also incorporate motion detection in conjunction with the pressure sensitive pads to further confirm that the patient is moving into a sitting position with intent to stand. Video recording may also be used (when appropriate) for monitoring.

The system 100 can include an intervention control module 330 that may be computer-implemented, and can trigger or otherwise control one or more intervention elements 104 and generate alerts for communication to an alert device 106 based on an output of the attempt detection module 320.

The system 100 can communicate with alert devices 106 at a nursing station, personal or mobile devices such as a cell phone, public announcement (PA) systems, or other communication centers at a care facility to call for assistance to help with fall prevention. For example, the system 100 may be able to display alerts at a smart watch that gives haptic, visual, and/or audio alerts for the person charged with maintaining safety of the patient.

Upon detection of an attempt or intention by the patient to stand and leave their bed or chair, the system 100 may issue one or more commands or alerts intended for the patient. For example, the system 100 may include an audio device that verbally tells the patient to "Stop, for your safety, please remain seated and wait for someone to help" or use other verbiage or feedback to communicate the need to wait for help from healthcare professionals or caregivers before the patient attempts to stand alone. In some examples, the system 100 may also provide distraction or intervention through multi-modal methods including augmented reality or tactile feedback.

To summarize:

The system 100 can provide a deterrent/distraction that allows supervising individuals some time to get to the room to intervene.

The system 100 will be able to identify movement patterns that suggest a patient getting out of the bed. This may include supine to sit, rolling out of bed, climbing over bed rails etc. These patterns must be developed to avoid false positives and thus alarm fatigue by the staff. In some examples, devices of the system 100 "notices" the movement patterns by the use of, or a combination of, pressure pads, non-marker movement sensors and may use algorithms to predict the body positions that would suggest the person is getting out of bed. The intervention elements, such as a robot using artificial intelligence (AI), will start to interact with the patient to distract them and stop them from getting out of bed.

Once movement patterns are noticed, intervention elements start to intervene. Intervening actions can include, for example, moving toward the patient (in the case of the robot) and/or projecting a holographic image in front of the patient to interact with the patient. At the same time as the system 100 detects the movement patterns that suggest the patient is getting out of bed, the system 100 alerts a supervising individual such as a nurse and/or the remote monitoring nurse through an alert device (e.g., a mobile device, PA system, etc.) who can then video/audio call into the room to talk to the patient and help to keep them seated and safe.

The system 100 can incorporate AI into the intervention elements. For example, a robot or holographic image may converse with the patient. Conversations may include but not limited to the following: (a) greeting the patient; (b) asking them how they are doing and conversing on this; (c) asking the patient what they need and responding to their answer in a way to show active listening techniques (repeat back what they said so is shows the robot or holographic image is listening); and (d) from these conversations relay information to the incoming supervising individual on their alert device so they are updated in real time on the needs of the patient.

Sensor Array

The sensor array 102 of the system 100 can include various visual, audio, motion, and pressure sensors positionable at various locations within a facility that communicate with the robot and the one or more alert devices.

Importantly, the sensor array 102 of the system 100 serves to capture spatiotemporal information about the patient to enable the system 100 to detect position shifts that indicate that the patient is trying to get out of bed. The sensor array 102 can also provide information to the robot 142 that enables the robot 142 to navigate a surrounding environment and move towards the bed of the patient.

The sensor array 102 can include one or more pressure sensors 122 positionable along a bed of a patient for detecting position shifts that may indicate that the patient is trying to get up by examining changes in weight distribution along the bed.

The sensor array 102 can also include one or more motion sensors 124 that can be "aimed" towards the bed of the patient to detect movements or position changes that indicate that the patient may be trying to get up. In some examples, the one or more motion sensors 124 may be used in conjunction with other sensors of the sensor array 102 to trigger data capture by the other sensors of the sensor array 102. Motion sensors 124 may be able to detect position of the patient based on known natural movements of the human body to indicate that the patient is attempting to get up (verified with pressure mapping data).

The sensor array 102 can further include one or more video capture devices and/or one or more audio capture devices (collectively, A/V capture sensors 126) to detect posture changes, position shifts, and sounds that may indicate that the patient is trying to get up.

In some examples, the sensor array 102 may also include one or more "tripwire" optical sensors, such as infrared (IR) sensors, that may detect when a patient places their legs along a side of the bed near the floor during an attempt to get up.

Figure 2B:
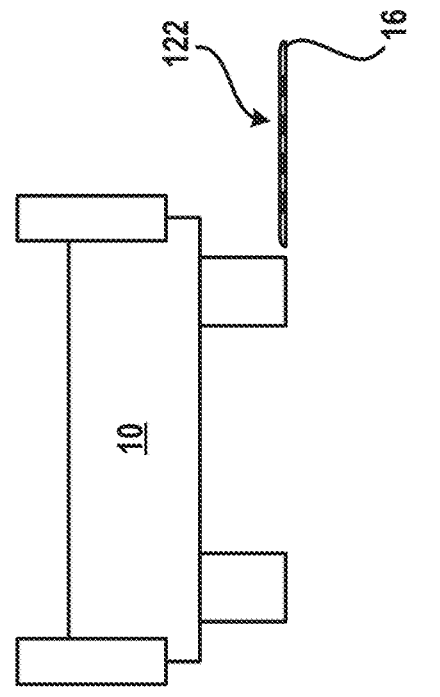
FIGS. 2A and 2B are a pair of illustrations showing pressure sensors of a sensor array of the fall prevention system of FIG. 1.
Figure 2A:
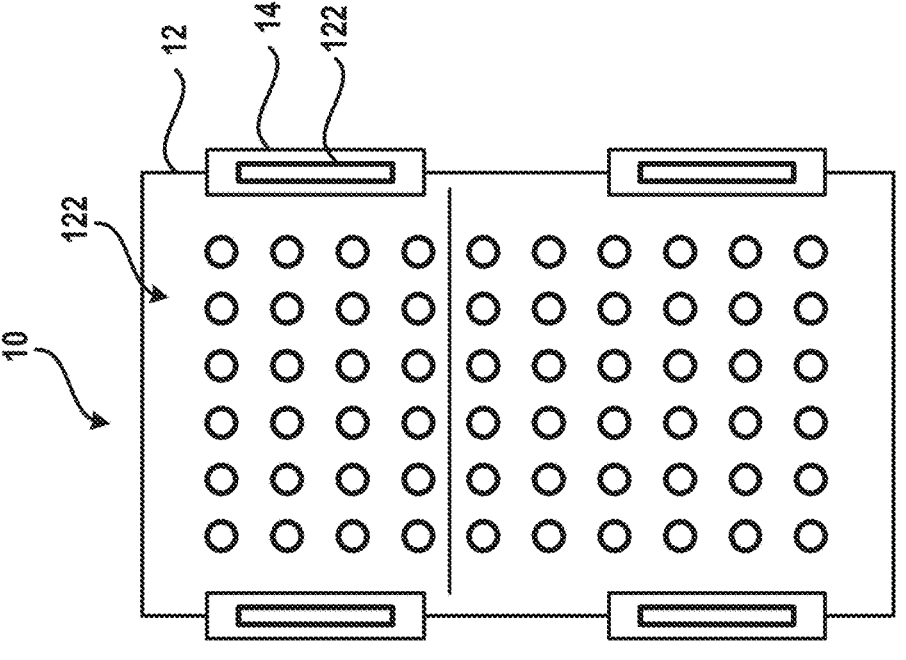

FIGS. 2A and 2B show an example arrangement of pressure sensors 122 which can be installed along furniture and other items within a room associated with the patient. In the example of FIG. 2A, a bed 10 includes a substrate 12 and one or more guardrails 14. As such, pressure sensor(s) 122 may be positioned along the substrate 12 in a grid pattern or other suitable arrangement to detect position shifts by the patient. Pressure sensor(s) 122 may also be present along guardrails 14 to detect attempts by the patient to steady themselves or use the guardrails 14 to lift themselves from the substrate 12. In the example of FIG. 2B, a floor mat 16 adjacent to the bed 10 can also include pressure sensor(s) 122 to detect a patient placing their feet on the floor.

Note that as the patient occupies the bed 10 without attempting to stand up, they may accidentally trigger the pressure sensor(s) 122 through actions such as adjusting their weight along the substrate 12 for comfort or contacting the guardrails 14. Guests in the room such as family members might also sit on the substrate 12, contact the guardrails 14, and/or step on the floor mat 16. Practitioners may also contact the guardrails 14 and/or step on the floor mat 16 as well. These benign events should not trigger intervention; as such, the attempt detection module 320 should be trained to discern signals for benign events from signals that correlate with motions indicating attempts to get out of bed.

The attempt detection module 320 can also combine sensor information provided by other sensor(s) (e.g., motion detection, audio and video signals) to determine if information from the pressure sensor(s) 122 correlate with an attempt to stand. For example, if the pressure sensor(s) 122 associated with the floor mat 16 indicate that someone has placed their feet on the floor mat, the system 100 may activate or otherwise observe data from a video camera (e.g., visual sensor of the A/V capture sensor(s) 126) to determine if the person stepping on the floor mat 16 is the patient or not, e.g., based on information discernable from video data such as visual characteristics, pose, and type of motion that is being captured.

The attempt detection module 320 may integrate time-dependent analysis of events captured by the sensor(s) to detect attempts by the patient to get up.

As such, the attempt detection module 320 can include a machine learning model which can be trained to detect an attempt by the patient to stand based on the sensor information, e.g., based on pressure distribution measurable across pressure sensors 122, based on motion data captured by motion sensors 124, based on a pose of the patient as captured by video capture devices of the A/V capture sensor(s) 126, based on audio data captured by audio sensors of the A/V capture sensor(s) 126, based on tripwire data captured by tripwire sensors, and/or a combination thereof, etc.

Intervention Elements

The system 100 can include the one or more intervention elements 104 positionable within a space designated for a patient, which can initiate an intervention action to interrupt (e.g., delay or prevent) the patient from attempting to get up. The intervention control module 330 implemented at a processor of computing device 200 can apply a control input to the one or more intervention elements 104 to initiate the intervention action.

Importantly, intervention elements 104 must stay out of the way of the person so as not to cause a trip hazard or have the patient try to physically move the intervention elements 104.

As shown, the one or more intervention elements 104 can be activated or implemented based on preferences by the patient, facility staff, and/or other supervising individuals. Intervention elements 104 can include, but are not limited to the robot 142 or the holographic projector 144. In some examples, the robot 142 or the holographic projector 144 can incorporate or otherwise embody an artificial intelligence "companion" which can interact with the patient and perform intervention actions such as giving audio or visual commands recommending that the patient stay seated or otherwise distracting the patient. Other intervention actions performed by the robot 142 or the holographic projector 144 can include asking the patient if they need help with anything, and may provide responses from the patient to a staff member or other supervising individual.

Intervention elements 104 can further include, but are not limited to light emitting devices 146 which can alter a lighting condition of the space, audio devices 148 that initiate playback of an audio message (and may be associated with the robot 142 and/or the holographic projector 144), motorized elements 150 positioned within the space (which can include decorative elements positioned along a wall, for example, or can include vibrotactile elements). Further, intervention elements 104 can include the interactive display 152 which may activate to delay or otherwise distract the patient. The interactive display 152 can establish communication between the patient and a communication device 108 associated with a staff member or otherwise supervising individual based on the control signal.

Robot

The intervention element(s) 104 of the system 100 can include the robot 142, which can be stationed within the room and interacts with the patient to discourage the patient from standing or otherwise delay their attempt. A processor of the computing device 200 may be located within the robot 142 or can be located elsewhere in communication with the robot 142.

As discussed, in some examples, the robot 142 can incorporate or otherwise embody an artificial intelligence "companion" which can interact with the patient and perform intervention actions such as giving audio or visual commands recommending that the patient stay seated or otherwise distracting the patient.

Other intervention actions performed by the robot 142 can include asking the patient if they need help with anything (e.g., requesting assistance need information from the patient), recording responses from the patient (e.g., recording assistance need information received from the patient), and providing or otherwise communicating responses from the patient to a staff member or other supervising individual (e.g., through an alert device or communication device). The system 100 may implement an "AI companion" through the robot 142 that uses natural language processing to converse with the patient and record responses. The robot 142 can, in some examples, initiate contact with a staff member or other supervising individual (e.g., through an alert device or communication device)

As discussed, conversations may include but not limited to the following: (a) greeting the patient and optionally requesting that they remain seated; (b) asking them how they are doing and conversing on this; (c) asking the patient what they need and responding to their answer in a way to show active listening techniques (repeat back or paraphrase what the patient said); and (d) from these conversations relay information to the incoming supervising individual on their alert device so they are updated in real time on the needs of the patient.

In some examples, the robot 142 can activate in response to a name or verbal request from a patient. The robot 142 can also activate in response to a control signal from the intervention control module 330 based on the sensor information and interpretation of the sensor information by the attempt detection module 320.

Figures 3A, 3B:
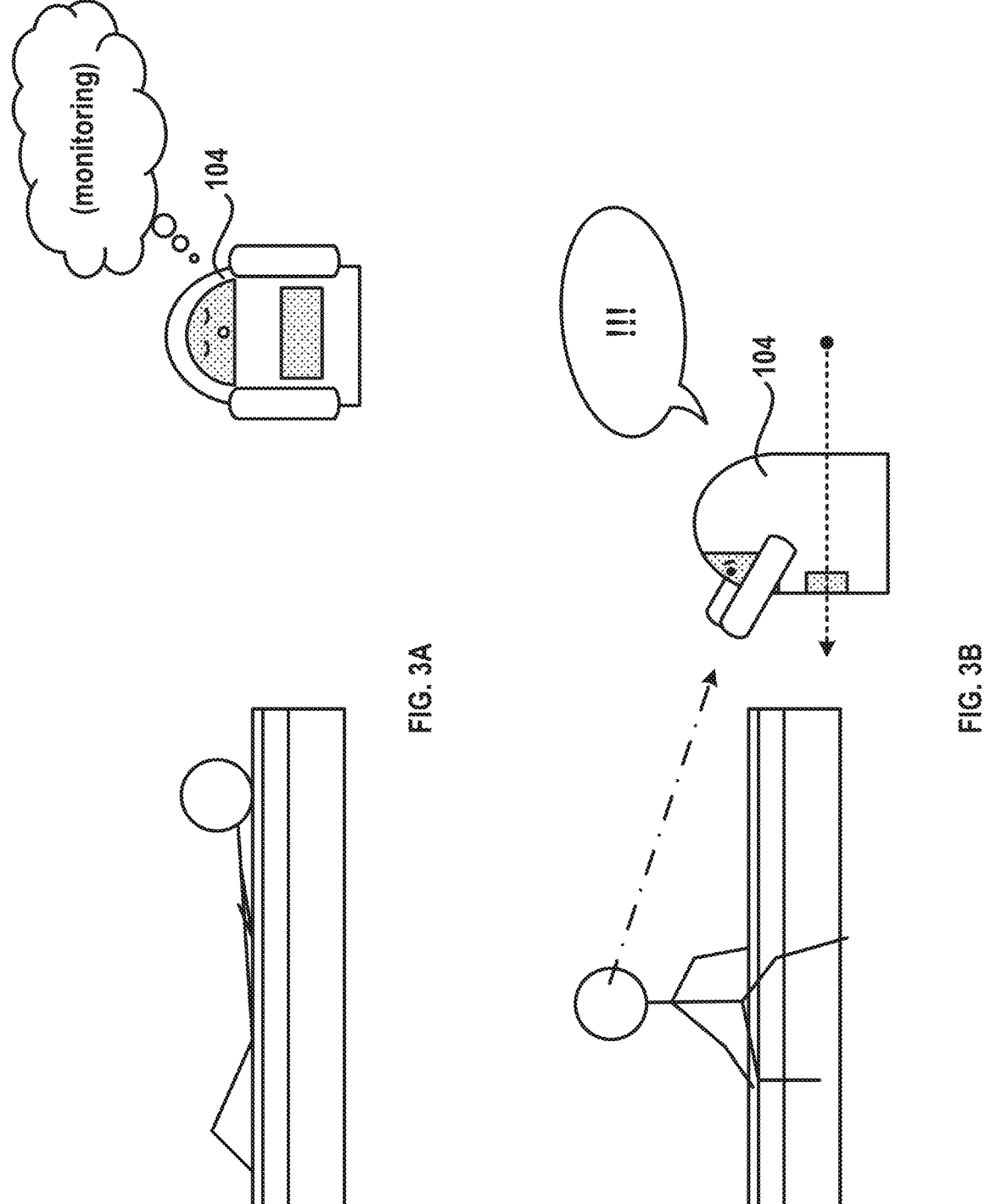
FIGS. 3A and 3B are simplified illustrations showing a robot of the fall prevention system of FIG. 1 interacting with a patient who is attempting to stand.

As shown in the non-limiting example of FIGS. 3A and 3B, the robot 142 of the system 100 can move from a first position away from the patient towards a second position adjacent to the bed to discourage the patient from standing. The system 100 may issue the one or more verbal commands through the robot 142. Further, the robot 142 can "raise its hands" to communicate the need to remain seated.

The robot 142 can include one or more mobilization elements (e.g., motorized wheel(s) or another component) operable for self-propulsion from a first location (FIG. 3A) to a second location (FIG. 3B) responsive to a mobilization signal received from the processor. The first location can be a "default" location where the robot 142 can be stationed within the room, and the second location can be in front of the patient or adjacent to the bed. Upon detection that the patient is attempting to stand, the processor can apply one or more mobilization signal(s) that cause the mobilization elements of the robot 142 to propel the robot 142 towards the bed of the patient. In some examples, the robot 142 can be operable for adaptive trajectory planning and obstacle avoidance to avoid collisions with objects and people.

The robot 142 can further include one or more members (e.g., "arms") that can be actuated between a first position (FIG. 3A) and a second position (FIG. 3B). The first position may be a "default" position, and the second position may be an "indicating" position that can resemble "raising its hands" to communicate the need to remain seated. Note that in some embodiments, the robot 142 may not attempt to try to directly prevent a fall using physical interventions, however in other embodiments the robot 142 may be able to physically intervene by "catching" the patient or providing a support structure for the patient to steady themselves.

In some examples, the robot 142 can include an audio output device operable for playback of an audio alert message responsive to a playback signal. The audio alert message can include verbal commands that tell the patient to "Stop, please remain seated" or use other verbiage or feedback. The robot may also include visual indicators such as lights, a screen, or other elements that provide further indication to the patient.

In some embodiments, the robot 142 can include one or more interfaces for interaction with the patient, such as an interactive face screen. The face screen may be programmed to portray, for example, an endearing or familiar face. The robot 142 could also have a "voice" that is also programmed to resemble that of a familiar family member or friend. Further, the robot 142 can have an interactive torso screen for programming the device with each patient. In some examples, the interactive torso screen of the robot can be used as the interactive display 152 to establish communication between the patient and the communication device 108 associated with a staff member or other supervising individual based on the control signal.

While the examples in FIGS. 3A and 3B show a semi-humanoid robot having arms, in other examples the robot 142 could be non-humanoid in form.

Holographic Projector

Figure 4:
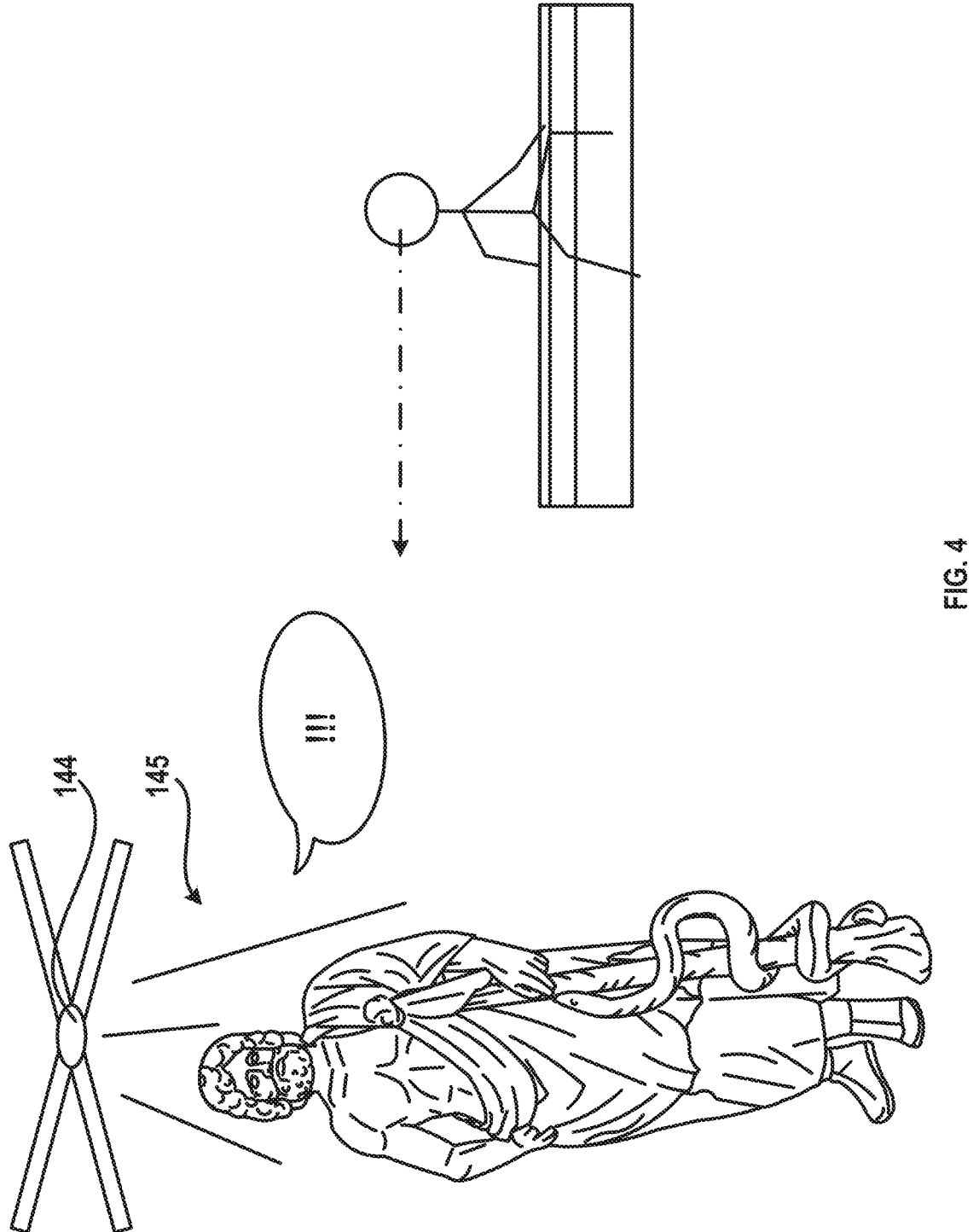
FIG. 4 is an illustration showing a holographic projector of the fall prevention system of FIG. 1 and a holographic image generated by the holographic projector.

In some examples, as shown in FIG. 4, the intervention element(s) 104 of the system 100 can include the holographic projector 144 that can project a holographic image 145 of an entity when the system 100 detects an attempt to stand. The holographic image can incorporate audio that provides verbal commands to stay and wait for someone to come and help, preventing a fall. The holographic image 145 can otherwise distract the patient, allowing time for personnel to attend to the patient.

The holographic image 145 can be a 2-dimensional or 3-dimensional image, and may resemble a familiar person or another entity. In the example of FIG. 4, the holographic image shown is based on a 3-dimensional statue of Asclepius (a mythical character), but may incorporate other images.

As discussed, in some examples, the holographic image 145 generated by the holographic projector 144 can incorporate or otherwise embody an artificial intelligence "companion" which can interact with the patient and perform intervention actions such as giving audio or visual commands recommending that the patient stay seated or otherwise distracting the patient.

Other intervention actions performed by the holographic image 145 can include asking the patient if they need assistance (e.g., requesting assistance need information from the patient), recording responses from the patient (e.g., recording assistance need information received from the patient), and providing or otherwise communicating responses from the patient to a staff member or other supervising individual (e.g., through an alert device or communication device). The system 100 may implement an "AI companion" through the holographic image 145 that uses natural language processing to converse with the patient and record responses. The holographic image 145 can, in some examples, initiate contact with a staff member or other supervising individual (e.g., through an alert device or communication device).

As discussed, conversations may include but not limited to the following: (a) greeting the patient and optionally requesting that they remain seated; (b) asking them how they are doing and conversing on this; (c) asking the patient what they need and responding to their answer in a way to show active listening techniques (repeat back or paraphrase what the patient said); and (d) from these conversations relay information to the incoming supervising individual on their alert device so they are updated in real time on the needs of the patient.

In some examples, the holographic image 145 can activate in response to a name or verbal request from a patient. The holographic image 145 can also activate in response to a control signal from the intervention control module 330 based on the sensor information and interpretation of the sensor information by the attempt detection module 320.

In some examples, the holographic projector 144 can be used with the interactive display 152 to establish communication between the patient and the communication device 108 associated with a staff member or other supervising individual based on the control signal, e.g., by displaying a holographic image of the staff member or other supervising individual.

Visual and Audio Distractors

In some embodiments, the intervention element(s) 104 can incorporate light emitting devices 146. audio devices 148, and/or motorized elements 150 which can activate based on the control signal received from the intervention control module 330.

In some examples, light emitting devices 146 and/or motorized elements 150 may incorporate light sources to distract or delay the patient, and may alter lighting conditions in the room (e.g., through dedicated light sources or changes to existing light sources within the room) to incorporate, for example, flashing lights or changing colors.

Figure 5B:
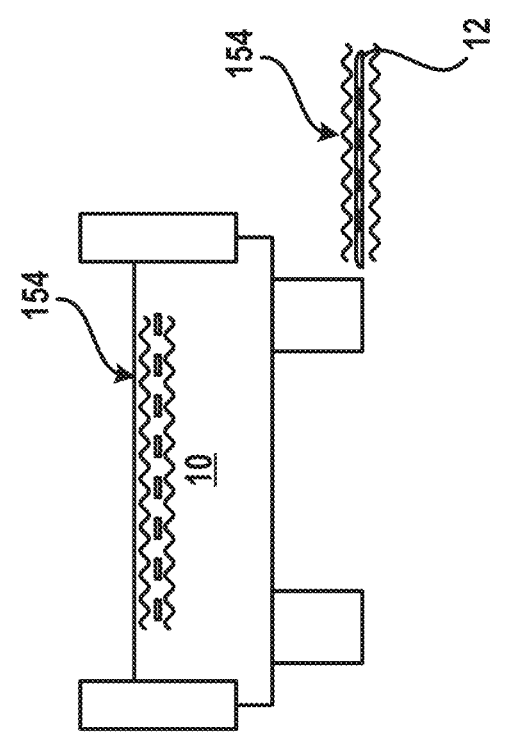
FIGS. 5A and 5B are a pair of illustrations showing motorized elements and audio devices of the fall prevention system of FIG. 1.
Figure 5A:
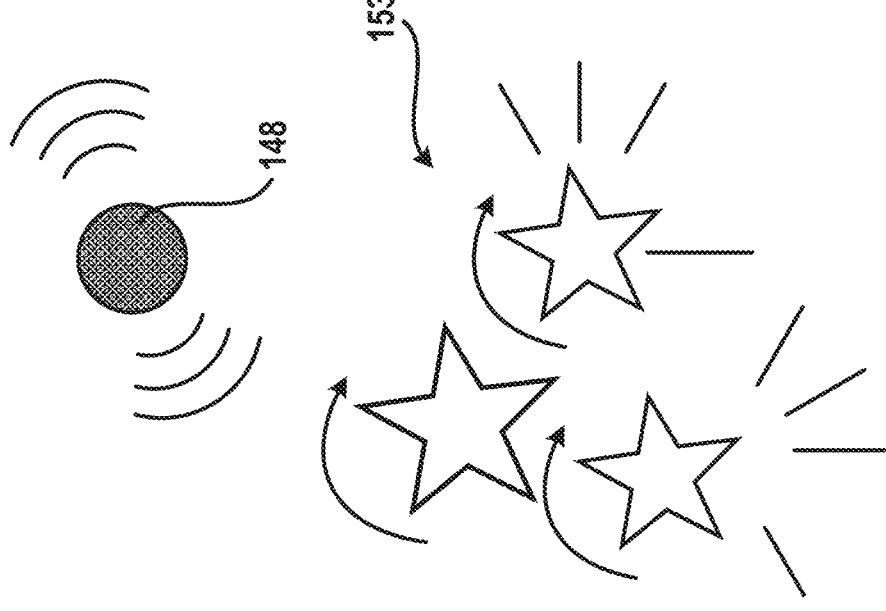

In the example of FIG. 5A, the motorized elements 150 are shown as one or more decorative elements 153 positioned within the room, e.g., along a wall, that may activate and "spin" based on the control signal. The decorative elements 153 may also include light sources and/or audio devices that activate based on the control signal received from the intervention control module 330.

The example of FIG. 5A also shows an audio device 148 that may be positioned within the room, and can activate based on the control signal received from the intervention control module 330.

In some examples, shown in FIG. 5B, the motorized elements 150 can also include vibrotactile elements 154 positionable along the bed 10 of the patient or another item such as the floor mat 16 (which may be associated with the pressure sensors) that vibrate based on the control signal received from the intervention control module 330.

Interactive Display

Figures 6A, 6B:
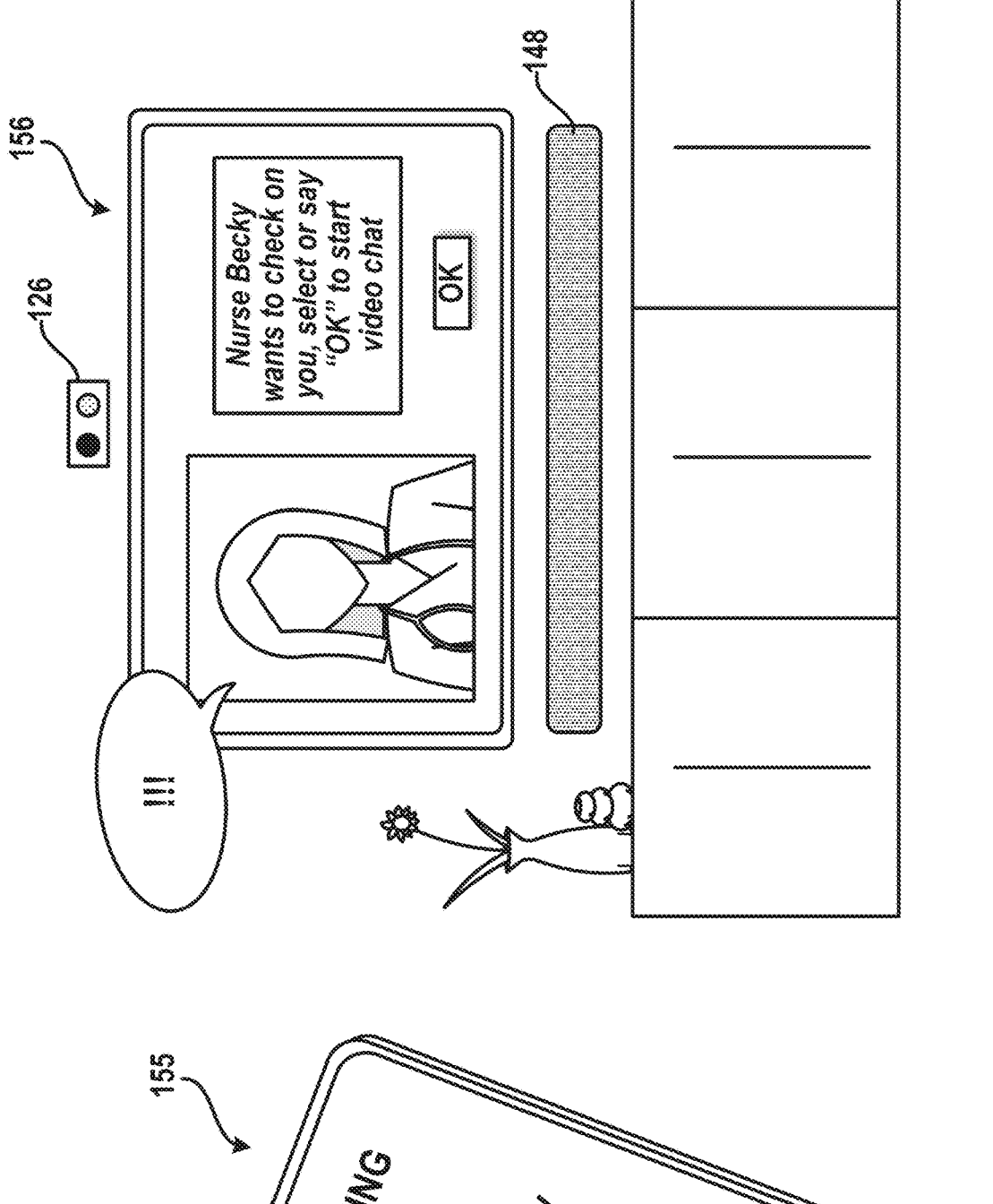
FIGS. 6A-6D are a series of simplified illustrations showing example interactive displays and user interfaces of the fall prevention system of FIG. 1.

As shown in FIG. 1 and with additional reference to FIGS. 6A-6D, the intervention element(s) 104 can also include the interactive display 152 which may activate to communicate with the patient based on the control signal received from the intervention control module 330. In some examples, the interactive display 152 can be part of a mobile device owned by a patient (e.g., through a dedicated mobile application) or which can be temporarily issued to the patient for the duration of their stay. As shown in the example of FIG. 6B, the interactive display 152 could also be incorporated into a television or other display device which may be present within the room, or may even be associated with the robot 142. In other examples, the interactive display 152 can be integrated into the robot 142 (e.g., as a "face" or "torso" screen) or the holographic projector 144 (which may display a holographic image of a staff member or other supervising individual).

The interactive display 152 may provide the patient with an opportunity to request help or to inform staff of an issue that is causing the patient to try to get up on their own. In addition, the interactive display 152 may provide staff with an opportunity to converse with, distract, delay, or otherwise interact with the patient while help is on the way. In some examples, such as in scenarios where a patient may be psychologically averse to using a dedicated "call help" button that may be typically reserved for urgent situations, the interactive display 152 may allow the patient to request help with getting up and/or to otherwise inform staff of a relatively non-urgent issue through a form with selectable options, a text-based chat, a phone call, or a video call. In a further aspect, the interactive display 152 may also be operable to receive voice commands and inputs from the patient.

The interactive display 152 can, in some examples, interface with the communication device(s) 108 and/or alert device(s) 106 to enable communication between the patient and a staff member. In the example of FIG. 6A, the interactive display 152 is implemented through a mobile device 155 associated with the patient. Upon detection of an event, the system 100 may prompt a staff member to initiate a call to the patient through communication device(s) 108 which may be received by the patient at the interactive display 152. This may prevent or delay the patient from attempting to stand on their own without help while allowing time for a staff member to physically attend to the patient, and may also give staff an opportunity to aid and/or reassure the patient that someone will be available to help.

In the example of FIG. 6B, the interactive display 152 is implemented through a television 156 or other display device which may already be installed within the space. The interactive display 152 may be accompanied by the A/V capture sensors 126 that captures video and audio of the patient for both sensing and communication, and may be directed towards a bed or other area that the patient may occupy. Similarly, upon detection of an event by the attempt detection module 320, the system 100 may prompt a staff member to initiate a call to the patient through communication device(s) 108 which may be received by the patient at the interactive display 152. This may prevent the patient from attempting to stand on their own without help while allowing time for a staff member to physically attend to the patient, and may also give staff an opportunity to aid and/or reassure the patient that someone will be available to help.

In some examples, the A/V capture sensors 126 may be part of the sensor array 102 to capture audio and/or video data of the patient for detecting attempts to get up, and may also communicate with the communication device(s) 108 associated with a supervising individual, e.g., so that the supervising individual can speak with and observe the patient through the communication device(s) 108.

Figure 6D:
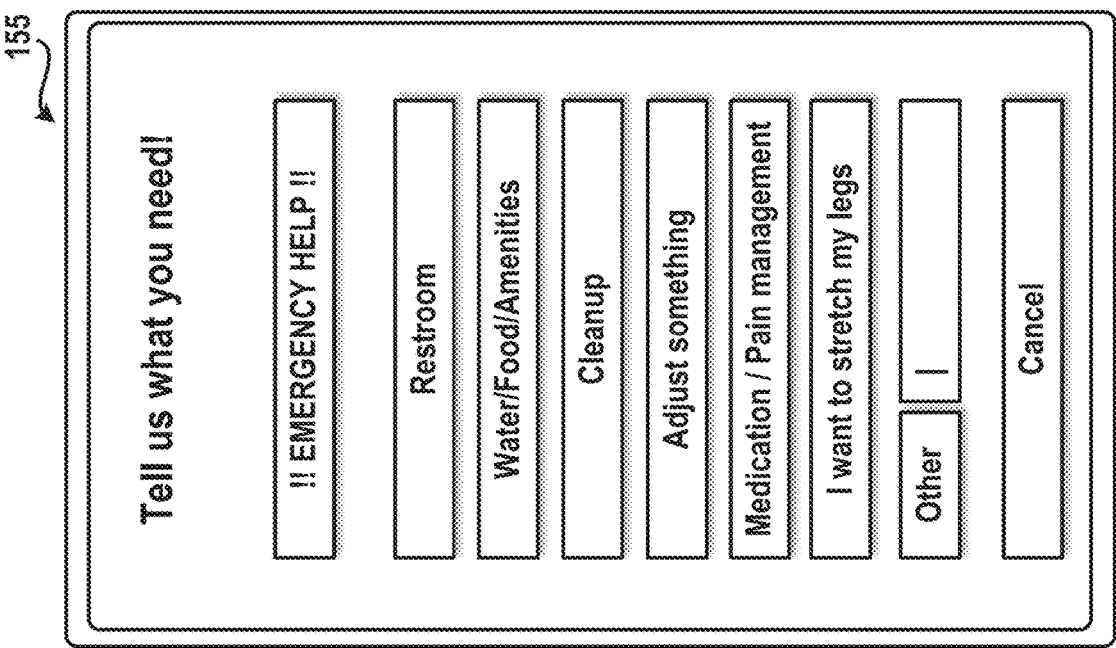
Figure 6C:
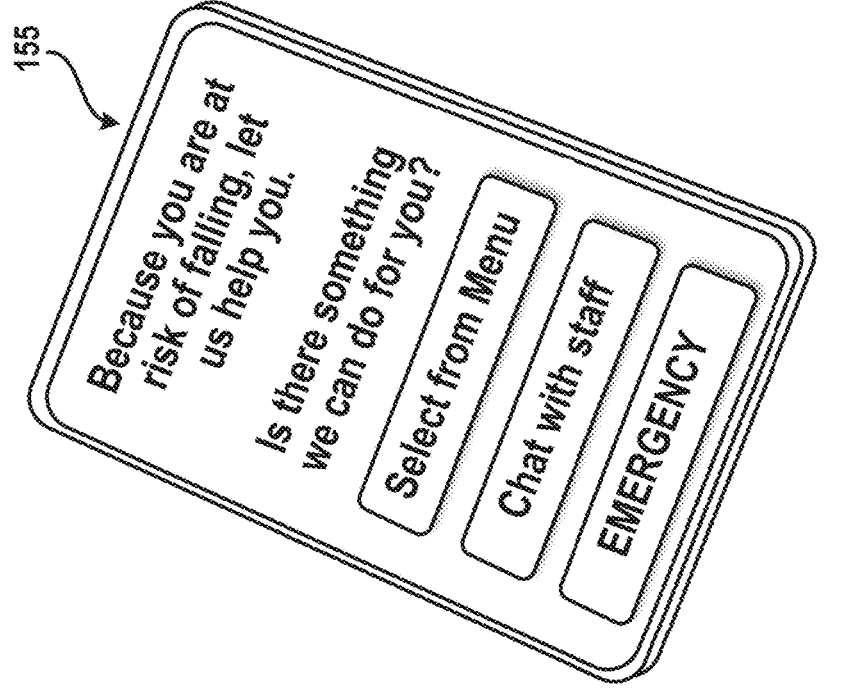

In the example of FIGS. 6C and 6D, the interactive display 152 can incorporate a user interface that prompts the patient to enter an input to address any issues upon detection of an attempt to get up. The user interface may, for example, provide an option to call or chat with a staff member or request emergency help (e.g., as an additional way for the patient to request urgent attention in addition to the dedicated "call help" button). Further, the user interface can include a selection menu where a patient can submit information about why they may be attempting to get up so that a staff member can review and respond accordingly. Examples shown in FIG. 6D include options for requesting help using the restroom, water, food or some other amenity, cleanup, adjustment of furniture, equipment or a sitting position, medication or pain management, "to stretch [their] legs", etc. The system 100 may provide inputs from the patient to staff through communication device(s) 108 and/or alert device(s) 106. Likewise, this may prevent the patient from attempting to stand on their own without help, to try to solve an issue themselves, or from attempting to "flag someone down", while allowing time for staff member to physically attend to the patient, prioritize any issues, determine who should respond, or to otherwise aid the patient.

Alert and Communication Devices

In addition to the sensor array 102 and the intervention elements 104, the system 100 can include or otherwise interface with alert devices 106 and communication devices 108, which can include haptic, audio, and/or visual indicators that communicate alerts to the patient and/or practitioners. For practitioners, the system 100 can interface with existing alert devices such as alarms, security systems, nurse stations, cell phones, pagers, and smart watches to communicate detection events. As discussed herein with respect to the interactive display 152, the system 100 can interface with other elements available to the patient such as screens, personal devices, and haptic devices to provide alerts to the patient requesting that the patient cease attempting to stand.

Further, the communication devices 108 can enable a caregiver, staff member, or other supervising individual to communicate directly with the patient. Some communication devices 108 may be part of the same device as the alert devices 106, such as mobile devices associated with a supervising individual. For example, a supervising individual may receive an alert at a mobile device and may initiate a communication session with the patient over the mobile device in response.

Active monitoring may be implemented through the sensor array 102 by a caregiver or practitioner via a camera of the robot using alert device(s) 106, which may include a smartphone app. The system 100 can enable a practitioner to talk to the patient via the robot 142 as well using alert device(s) 106.

Internal programming can also prioritize patient fall risk based on, for example, a "STEADI" protocol by the CDC for assessing all risk. A caregiver or practitioner would have information about their patients on their alert device(s) 106 prioritized based on this fall risk assessment.

Figure 7:
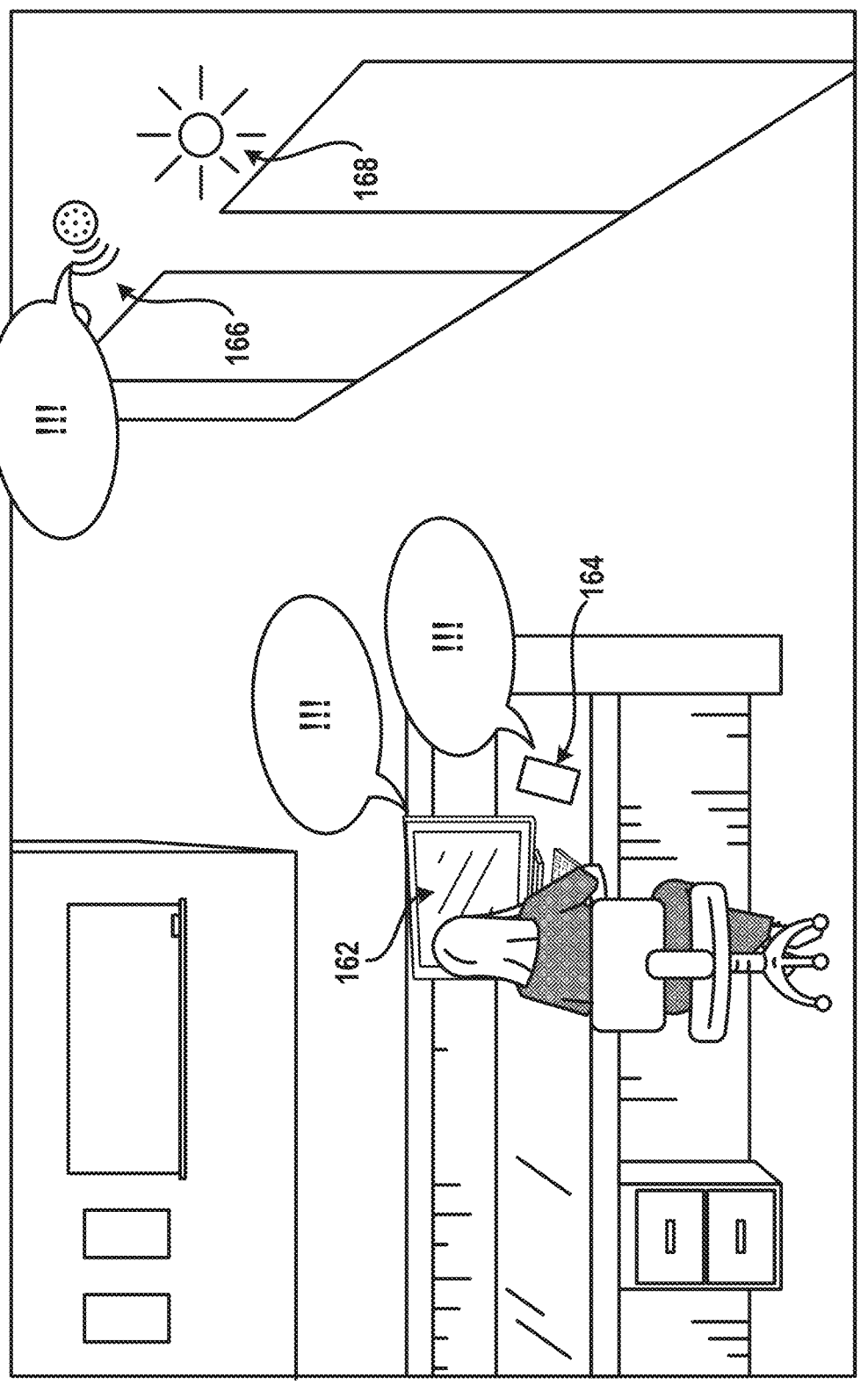
FIG. 7 is an illustration showing alert devices and communication devices of the fall prevention system of FIG. 1.

FIG. 7 shows an example implementation of alert devices 106 which may be monitored by a staff member, such as a computer station 162, a mobile device 164, an audio device 166 such as a public announcement (PA) system, and/or a light emitting device 168. Some alert devices in FIG. 7 may also serve as communication devices 108 for communicating with the patient, such as mobile device 164 or computer station 162 in FIG. 7.

Computing Device

Figure 8:
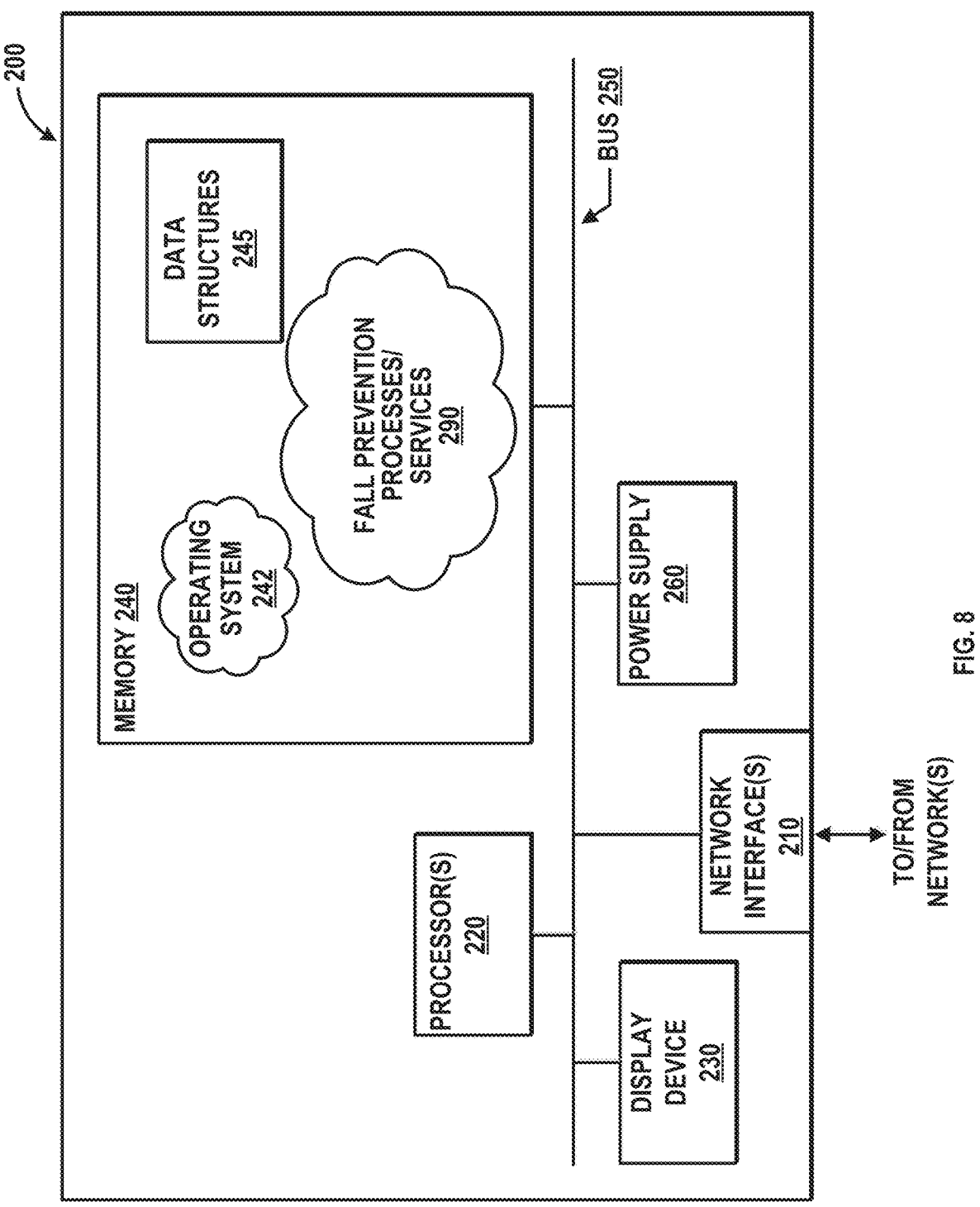
FIG. 8 is a simplified diagram showing an example computing device for implementation of the system of FIG. 1.

FIG. 8 is a schematic block diagram of an example computing device 200 that may be used with one or more embodiments described herein, e.g., as a component of the system 100 implementing the sensor integration module 310, the attempt detection module 320, and the intervention control module 330 shown in FIG. 1. The computing device 200 can also be used as part of alert device(s) 106 and/or communication device(s) 108.

Computing device 200 comprises one or more network interfaces 210 (e.g., wired, wireless, PLC, etc.), at least one processor 220, and a memory 240 interconnected by a system bus 250, as well as a power supply 260 (e.g., battery, plug-in, etc.). Further, computing device 200 can include or otherwise communicate with a display device 230 for interfacing with a user.

The computing device 200 can be operable for receiving and interpreting sensor information from the sensor array and determining a likelihood that a patient is trying to leave their bed based on the sensor information. Based on the likelihood, the processor 220 can activate a mitigation mode of the robot 142 that causes the robot 142 to "wake" and start moving towards the bed with "arms" raised. The processor

220 can also generate alert signals for communication to alert device(s) 106 that indicate to a practitioner that the patient is attempting to leave the bed, and/or that ask the patient to remain within their bed.

The memory 240 can include instructions executable by the processor to: access sensor information obtained from a sensor array in communication with the processor, the sensor array being positioned within a space designated for a patient and being operable for capturing sensor information about the patient; determine, based on the sensor information, whether a position change of a patient is occurring or has occurred that indicates that the patient is attempting to stand (e.g., indicating whether a patient is attempting to stand or moving with the intent to stand); apply, based on the sensor information, a control signal to the one or more intervention elements that initiates an intervention action to interrupt the patient; and generate, based on the sensor information, an alert signal for communication to an alert device associated with a supervising individual.

In examples where the one or more intervention elements is a holographic projector, the memory 240 can include instructions executable by the processor to generate a control signal for application to the holographic projector to display a holographic image.

In examples where the one or more intervention elements is an audio output device, the memory 240 can include instructions executable by the processor to generate a control signal for application to the audio output device to initiate playback of an audio message.

In examples where the one or more intervention elements is a light emitting device, the memory 240 can include instructions executable by the processor to generate a control signal for application to the light emitting device that activates the light emitting device or otherwise alters a lighting condition of the space based on the control signal.

In examples where the one or more intervention elements is a motorized element (such as a decorative element in FIG. 5A or a vibrotactile element in FIG. 5B), the memory 240 can include instructions executable by the processor to generate a control signal for application to the motorized element that activates the motorized element based on the control signal.

Further, the memory 240 can include instructions executable by the processor to: establish communication between an interactive display device associated with the patient and a communication device associated with a supervising individual based on the control signal.

In some examples, the memory 240 can include instructions executable by the processor to: generate mobilization signals for application to the mobilization element(s) of the robot that cause the mobilization element(s) to propel the robot from the first location to the second location; and initiate playback of the audio alert message at the audio output device.

In some examples, generating the mobilization signals include determining, based on video capture data received from the sensor array, a mobilization path between the first location and the second location.

Position shifts that can indicate a detection event (e.g., where the patient attempts to stand or moves with intent to stand) can include, for example, transitioning from a supine position to a seated position. Detection events may also be triggered when the patient is observed transitioning from a "resting" seated position with their feet on the bed to a seated position where the patient shifts their feet off of the bed and places weight on their hands to try to lift themselves off of the bed.

While some seated positions or shifts between positions may not necessarily indicate intent to stand up, the system may be operable to discern some position shifts from others. The system may incorporate sensor information captured from different types of sensors of the sensor array to further differentiate between position shifts that do not indicate intent to stand and positions shifts that do.

In some examples, the system can incorporate machine learning model(s) to discern between sensor information indicative of a patient's intent to stand and noise. The memory 240 can include instructions executable by the processor to: apply the sensor information as input to a machine learning model, the machine learning model being trained to detect an attempt by the patient to stand based on pressure distribution measurable across the one or more pressure sensors; and apply the sensor information as input to a machine learning model, the machine learning model being trained to detect an attempt by the patient to stand based on a pose of the patient as captured by the one or more video capture devices.

Network interface(s) 210 include the mechanical, electrical, and signaling circuitry for communicating data over the communication links coupled to a communication network. Network interfaces 210 are configured to transmit and/or receive data using a variety of different communication protocols. As illustrated, the box representing network interfaces 210 is shown for simplicity, and it is appreciated that such interfaces may represent different types of network connections such as wireless and wired (physical) connections. Network interfaces 210 are shown separately from power supply 260, however it is appreciated that the interfaces that support PLC protocols may communicate through power supply 260 and/or may be an integral component coupled to power supply 260.

Memory 240 includes a plurality of storage locations that are addressable by processor 220 and network interfaces 210 for storing software programs and data structures associated with the embodiments described herein. In some embodiments, device 200 may have limited memory or no memory (e.g., no memory for storage other than for programs/processes operating on the device and associated caches). Memory 240 can include instructions executable by the processor 220 that, when executed by the processor 220, cause the processor 220 to implement aspects of the system 100 and associated methods outlined herein.

Processor 220 comprises hardware elements or logic adapted to execute the software programs (e.g., instructions) and manipulate data structures 245. An operating system 242, portions of which are typically resident in memory 240 and executed by the processor, functionally organizes device 200 by, inter alia, invoking operations in support of software processes and/or services executing on the device. These software processes and/or services may include fall prevention processes/services 290, which can include aspects of the methods and/or implementations of various modules described herein. Note that while fall prevention processes/services 290 is illustrated in centralized memory 240, alternative embodiments provide for the process to be operated within the network interfaces 210, such as a component of a MAC layer, and/or as part of a distributed computing network environment.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules or engines configured to operate in accordance with the techniques herein (e.g., according to the functionality of a similar process). In this context, the term module and engine may be interchangeable. In general, the term module or engine refers to model or an organization of interrelated software components/functions. Further, while the fall prevention processes/services 290 is shown as a standalone process, those skilled in the art will appreciate that this process may be executed as a routine or module within other processes.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

The invention claimed is:

1. A system, comprising:
a processor in communication with a memory and the intervention element, the memory including instructions executable by the processor to:
access temporally adjacent sensor observations obtained from a sensor array in communication with the processor, the sensor array being positioned within the space designated for the patient;
determine, using time-dependent analysis of the temporally adjacent sensor observations, that a position-change pattern of a patient is indicative of the patient attempting to stand; and
apply, based on the position-change pattern, a control signal to the intervention element to initiate a patient-facing interactive engagement performed locally by the intervention element that: (i) establishes a two-way exchange with the patient via audio and/or visual modalities, (ii) elicits and receives assistance-need information from the patient via spoken or non-verbal inputs, and (iii) provides, via the intervention element, an audible, visual, or tactile acknowledgment that assistance has been notified.

2. The system of claim 1, the memory further including instructions executable by the processor to:
generate, based on the temporally adjacent sensor observations, an alert signal for communication to an alert device associated with a supervising individual.

3. The system of claim 2, the alert device including one or more haptic display elements, one or more audio display elements, and/or one or more visual display elements.

4. The system of claim 1, the memory further including instructions executable by the processor to:
capture the assistance-need information received from the patient; and
communicate the assistance-need information to a supervising individual through an alert device.

5. The system of claim 1, the sensor array including one or more pressure sensors.

6. The system of claim 5, the memory further including instructions executable by the processor to:
apply the temporally adjacent sensor observations as input to a machine learning model, the machine learning model being trained to detect the position-change pattern based on pressure distribution measurable across the one or more pressure sensors.

7. The system of claim 1, the sensor array including one or more video capture devices.

8. The system of claim 7, the memory further including instructions executable by the processor to:
apply the temporally adjacent sensor observations as input to a machine learning model, the machine learning model being trained to detect the position-change pattern based on a pose of the patient as captured by the one or more video capture devices.

9. The system of claim 1, the intervention element including a robot.

10. The system of claim 9, the control signal being applied to the robot to cause the robot to move from a first location to a second location, the second location being associated with the patient.

11. The system of claim 1, the intervention element including a holographic projector, and the control signal being applied to the holographic projector to display a holographic image.

12. The system of claim 1, the intervention element including an audio output device and the control signal being applied to the audio output device to initiate playback of an audio message.

13. The system of claim 1, the intervention element including a light emitting device that alters a lighting condition of the space responsive to the control signal.

14. The system of claim 1, the intervention element including a motorized element positionable within the space responsive to the control signal.

15. The system of claim 1, the intervention element including an interactive display device that establishes communication between the patient and a communication device associated with a supervising individual based on the control signal.

16. The system of claim 1, wherein the patient-facing interactive engagement is executed at the intervention element by presenting a prompt via the intervention element, receiving patient inputs via the intervention element, and interpreting the patient inputs using at least one of: (i) natural-language processing applied to speech and/or text inputs; (ii) processing of non-verbal inputs provided via a user interface of the intervention element.

17. A method, comprising:
accessing temporally adjacent sensor observations obtained from a sensor array in communication with a processor, the sensor array being positioned within a space designated for a patient;
determining, using time-dependent analysis of the temporally adjacent sensor observations, that a position-change pattern of the patient is indicative of the patient attempting to stand; and
applying, based on the position-change pattern, a control signal to an intervention element to initiate a patient-facing interactive engagement performed locally by the intervention element that: (i) establishes a two-way exchange with the patient via audio and/or visual modalities, (ii) elicits and receives assistance-need information from the patient via spoken or non-verbal inputs, and (iii) provides, via the intervention element, an audible, visual, or tactile acknowledgment that assistance has been notified.

18. The method of claim 17, further comprising:
generating, based on the temporally adjacent sensor observations, an alert signal for communication to an alert device associated with a supervising individual.

19. The method of claim 17, further comprising:

applying the temporally adjacent sensor observations as input to a machine learning model, the machine learning model being trained to detect the position-change pattern based on pressure distribution measurable across one or more pressure sensors of the sensor array.

20. The method of claim 17, further comprising:

applying the temporally adjacent sensor observations as input to a machine learning model, the machine learning model being trained to detect the position-change pattern based on a pose of the patient as captured by one or more video capture devices of the sensor array.

21. The method of claim 17, further comprising:

recording the assistance-need information received from the patient; and communicating the assistance-need information to a supervising individual through an alert device.

22. The method of claim 17, further comprising executing the patient-facing interactive engagement at the intervention element by:

presenting a prompt via the intervention element, receiving patient inputs via the intervention element, and interpreting the patient inputs using at least one of: (i) natural-language processing applied to speech and/or text inputs; (ii) processing of non-verbal inputs provided via a user interface of the intervention element.

\* \* \* \* \*